United States Patent
Verbil et al.

(10) Patent No.: US 6,643,359 B2
(45) Date of Patent: Nov. 4, 2003

(54) DATA-ONLY TELEPHONE SERVICE

(75) Inventors: John M. Verbil, Scottsdale, AZ (US); Martin R. Marks, Phoenix, AZ (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/866,427

(22) Filed: May 25, 2001

(65) Prior Publication Data

US 2002/0176550 A1 Nov. 28, 2002

(51) Int. Cl.[7] .............................................. H04M 11/00
(52) U.S. Cl. ................. 379/90.01; 379/93.05; 379/221.09
(58) Field of Search ..................... 379/90.01, 93.05, 379/93.06, 93.07, 93.08, 93.09, 100.01, 100.09, 100.12, 100.15, 100.17, 196, 197, 198, 221.08, 221.09

(56) References Cited

U.S. PATENT DOCUMENTS

| | | | | |
|---|---|---|---|---|
| 5,436,957 A | * | 7/1995 | McConnell | 379/197 |
| 5,940,755 A | * | 8/1999 | Scott | 455/426 |

FOREIGN PATENT DOCUMENTS

| | | | | |
|---|---|---|---|---|
| JP | 407046324 A | * | 2/1995 | H04M/3/54 |
| JP | 407162524 A | * | 6/1995 | H04M/3/42 |
| JP | 410233847 A | * | 9/1998 | H04M/11/00 |

* cited by examiner

*Primary Examiner*—Melur Ramakrishnaiah
(74) *Attorney, Agent, or Firm*—Brooks Kushman P.C.

(57) ABSTRACT

Data-only telephone service is supported by determining if a call placed from a telephone line, designated as data-only, is to a validated data line. If not, the call is disconnected.

20 Claims, 4 Drawing Sheets

DATA-ONLY TELEPHONE SERVICE

BACKGROUND OF THE INVENTION

1. Field of the Invention

The present invention relates to providing data services over standard telephone lines.

2. Background Art

An ever-increasing number of homes and businesses include personal computers and other digital equipment that exchange information with remote locations. Many types of equipment, techniques and media have been developed for information exchange, including high bandwidth links such as T-1 carrier systems, long-haul optical systems, cable modems, satellite systems, digital subscriber loop (xDSL) systems, standard telephone connections, and the like. Characteristics for comparing various remote information exchange systems include bandwidth, availability, symmetric capability, cost, and the like. Some techniques are not available in all locations. Further, many techniques require special equipment, special interconnect channels, or both. Thus, there may be high initial start-up costs in addition to periodic or per-use charges. High cost and availability restrictions place many high speed data access means outside the reach of some home and small business users.

Standard telecommunications connection is a virtually universally available medium. It is difficult to find many homes or small businesses desiring to exchange digital information which are not connected to the telephone system. The only user equipment required is a modem, which is often included with many personal computers and, if not, is available for a nominal fee. There is typically no start-up cost to access a digital service provider through the telephone system. Also, periodic or per-use fees charged by information service providers are typically lower for standard phone line connections than for any other data interconnect means. One additional cost, however, is the per-use charge incurred for using the telephone line.

What is needed is to reduce the cost of using standard telephone lines when accessing digital information. This will allow users from virtually anywhere to access digital information at a reduced cost.

SUMMARY OF THE INVENTION

The present invention provides for data-only telephone service by determining if a call placed from a telephone line designated data-only is to a validated data line. If not, the call is disconnected. The present invention thus permits reduced tariff charges on the data-only line since supporting such a line requires less usage of telecommunications network components.

A system for data-only telephone service on a subscriber telephone line is provided. The system includes a switch connected to the line which suspends a call received from the line and generates a message containing the called number obtained from the received call. A service control point receives the message and determines that the call is to be disconnected if the called number is not to a validated data line.

In an embodiment of the present invention, the service control point determines if the called number is to a validated data line based on the subscriber or calling telephone number.

In another embodiment of the present invention, the system further includes an intelligent peripheral placing a call to the called number. The called number is determined to be a validated data line based on receiving a modem tone back from the call placed to the called number.

In still another embodiment of the present invention, the switch connects the received call to an emergency service provider if the called number is identified as an emergency number prior to suspending the received call.

In yet another embodiment of the present invention, the service control point disconnects the received call if the called number is not a local number and not a toll-free number.

A method of providing data-only telephone service is also provided. A call is received at a switch servicing a telephone line designated as a data-only line. The received call is suspended at the switch. The called number is forwarded to a service control point where a determination is made as to whether or not the called number is to a validated data line. If the called number is to a validated data line, the received call is connected with the called number. If not, the received call is disconnected.

In an embodiment of the present invention, determining if the called number is a validated data line includes routing the call from the switch to an intelligent peripheral. The called number, originally placed by the received call, is called from the intelligent peripheral. If the called number responds with a modem tone, the received call is connected to the called number at the intelligent peripheral. Otherwise, both the received call and the called number called from the intelligent peripheral are disconnected.

In another embodiment of the present invention, the called number is determined not to be in a table of validated data lines. The intelligent peripheral is commanded to call the called number. If the intelligent peripheral receives a modem tone from the called number call, the switch is instructed to route the received call to the called number. The called number may be stored in the table of validated data lines. If the intelligent peripheral does not receive a modem tone from the called number, the received call is disconnected.

In another embodiment of the present invention, each validated data line is periodically called to determine if the line is still a data line based on receiving a modem tone.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
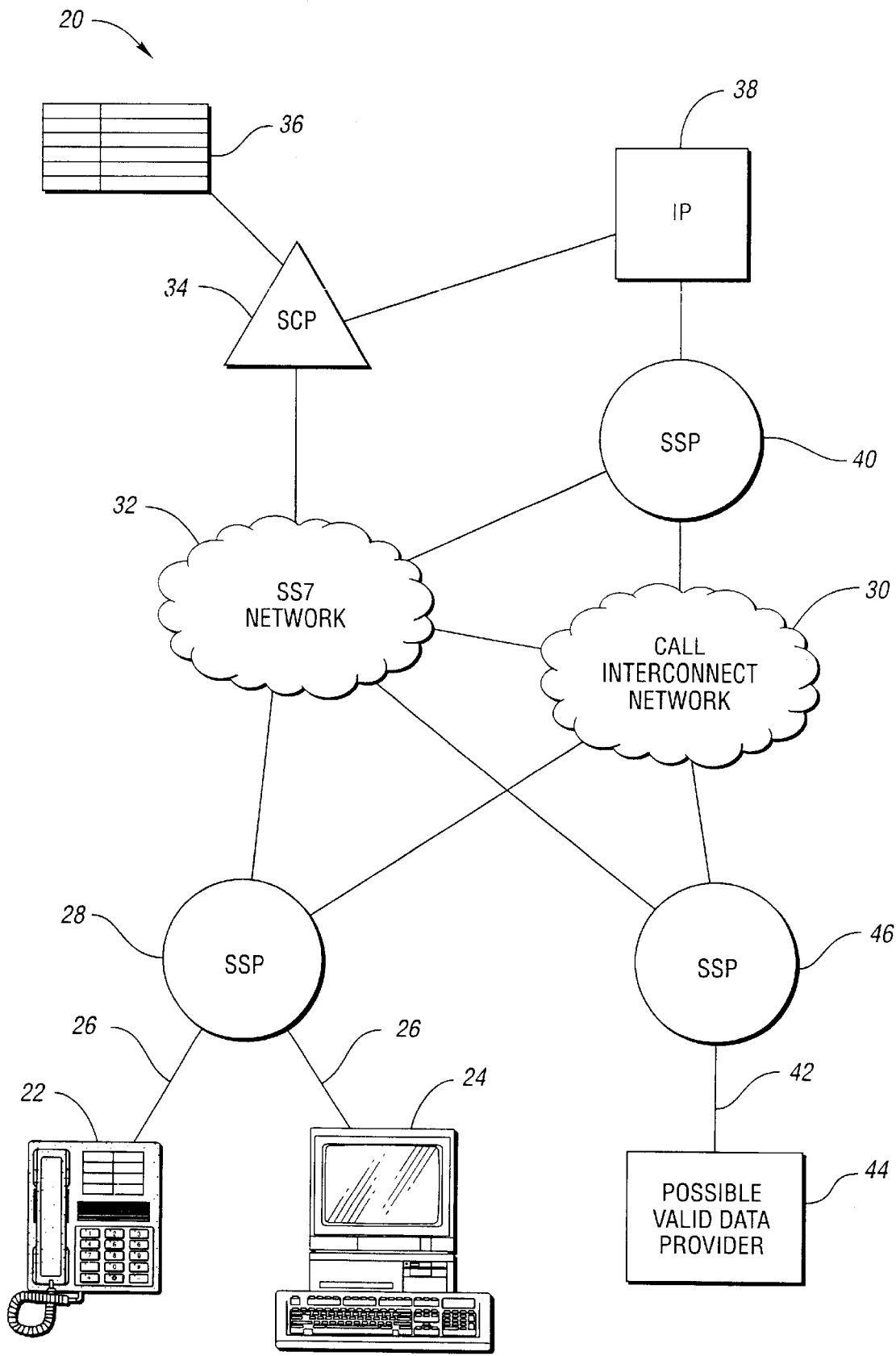
FIG. 1 is a block diagram of a telecommunications system for implementing data-only telephone service according to an embodiment of the present invention.

With reference to FIG. 1, a block diagram of a telecommunications system for implementing data-only telephone service according to an embodiment of the present invention is shown. A telecommunications system, shown generally by 20, includes various telecommunications devices through which users access data at remote providers. These devices may include manually dialed telecommunication device 22 which connects to telecommunications system 20 in response to a called number manually entered by the user. Automatically dialed telecommunications device 24 accesses telecommunications system 20 through an automatically dialed telephone number. Device 24 is typically implemented using a modem controlled by a personal computer or other logic device. Each telecommunications device 22,24 is connected to telecommunications system 20 through data-only designated line 26. Data-only line 26 is a standard telephone line which has been recognized by the user and telecommunications system 20 as being principally assigned to data access operations.

Data-only line 26 connects telecommunications device 22,24 with switch 28 in a local service switching point (SSP) or central office. Data line 26 may be configured with a denied termination feature so that no calls can be completed to line 26. Data line 26 may also be configured with an AIN Off-Hook Delay trigger. Switch 28 routes information content through call interconnect network 30 to the called destination. Switch 28 routes signaling content through SS7 network 32. The operations of call interconnect network 30 and SS7 network 32 are well known in the art of telecommunications.

Telecommunications system 20 includes service control point (SCP) 34 in communication with SS7 network 32. SCP 34 maintains valid data line table 36 listing the telephone numbers of valid data lines. Telecommunications system 20 may also include intelligent peripheral (IP) 38 connected to call interconnect network 30 through SSP 40. IP 38 may be programmed to perform a variety of functions, such as responding to DTMF key depressions, playing recorded messages, placing calls, voice recognition, tone recognition, and the like.

In operation, telecommunications system 20 receives a call on data-only line 26 specifying the telephone number of called line 42 connecting possible valid data provider 44 to call interconnect network 30 through SSP 46. Telecommunications system 20 determines if called line 42 is a validated data line. If so, data-only line 26 is connected to called line 42 through call interconnect network 30. If called line 42 is not a validated data line, the call placed on data line 26 is disconnected.

Figure 2:
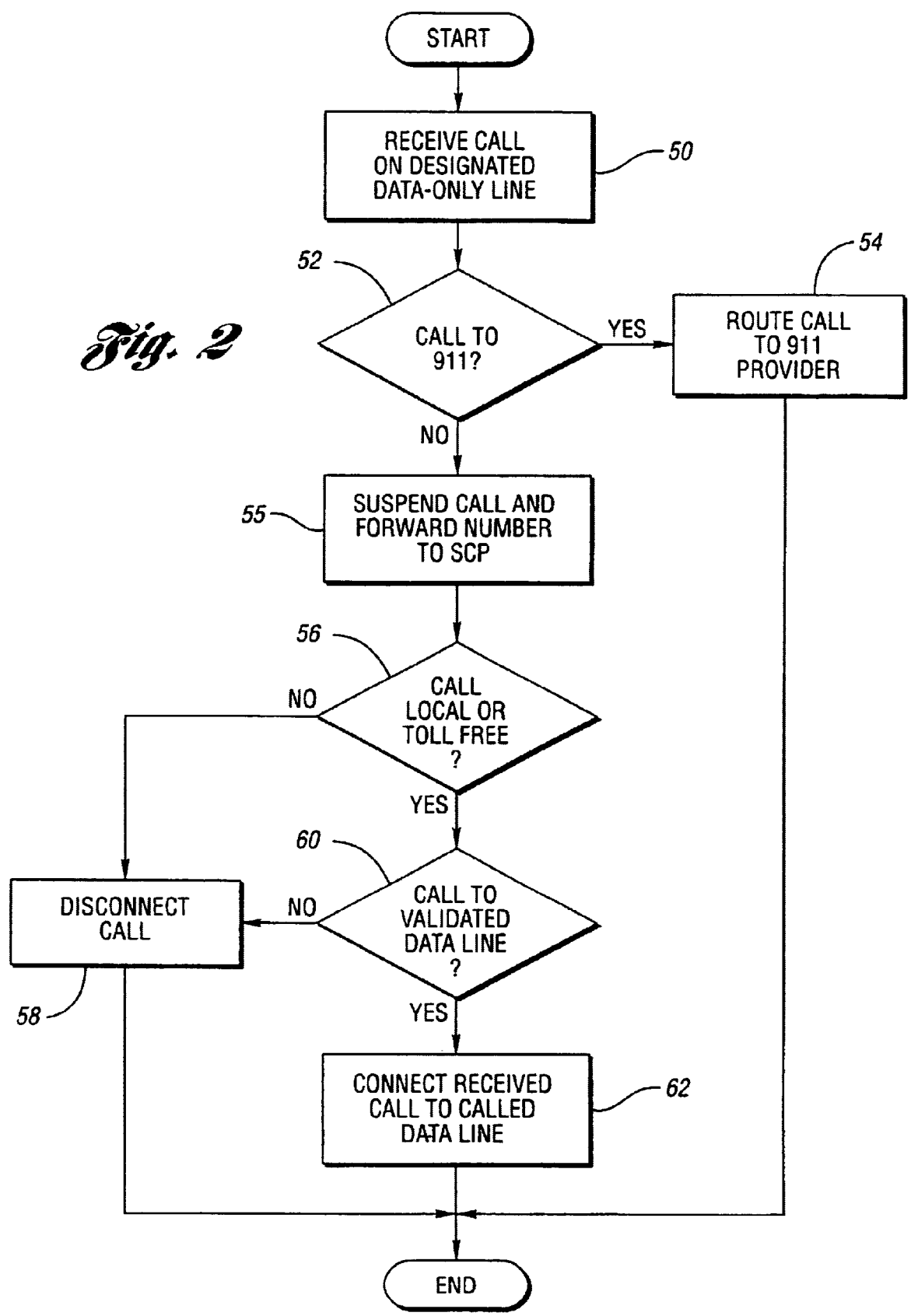
FIG. 2 is a flow diagram illustrating data-only telephone service according to an embodiment of the present invention.
Figure 3:
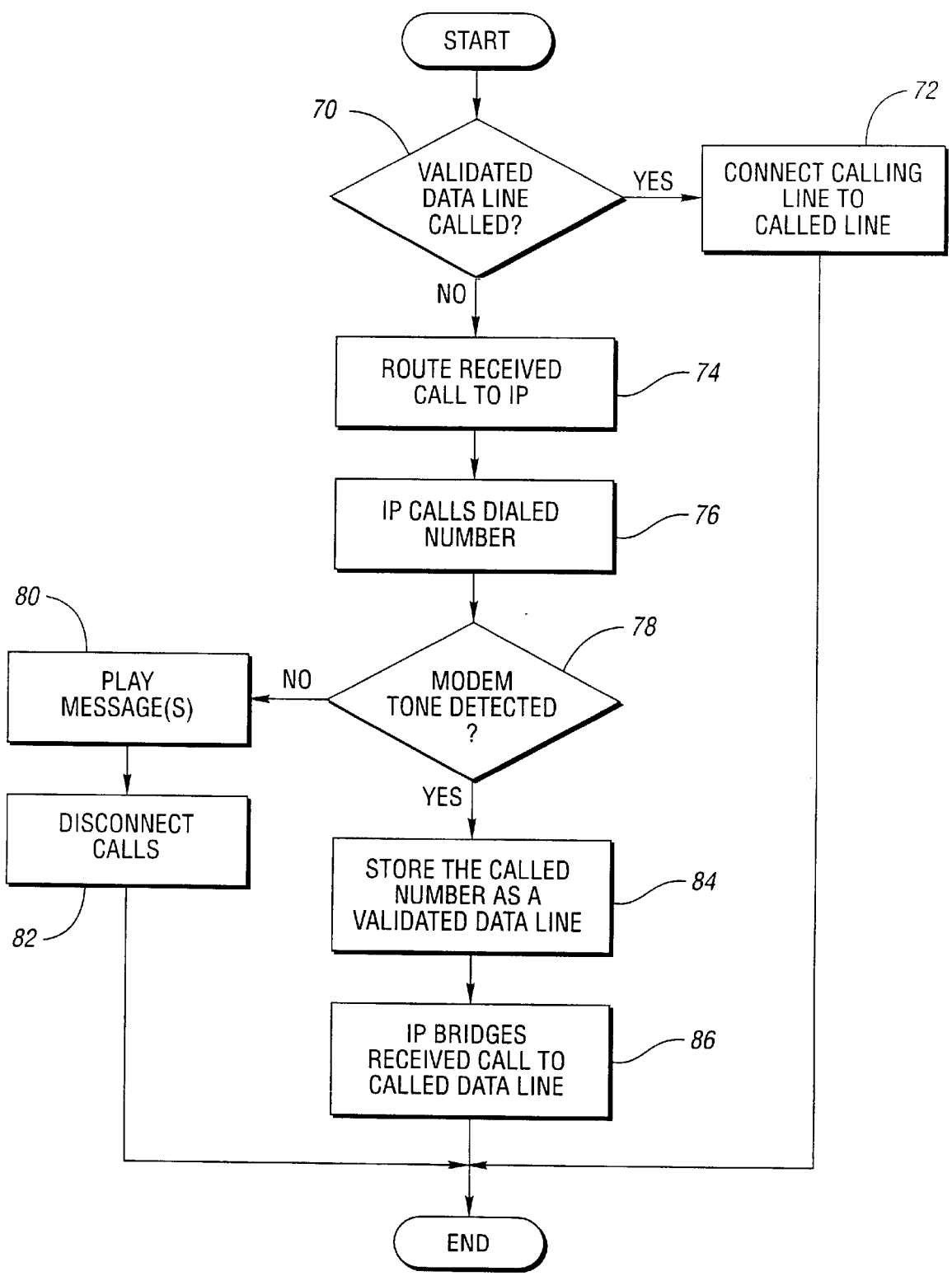
FIG. 3 is a flow diagram illustrating data line validation according to an embodiment of the present invention.
Figure 4:
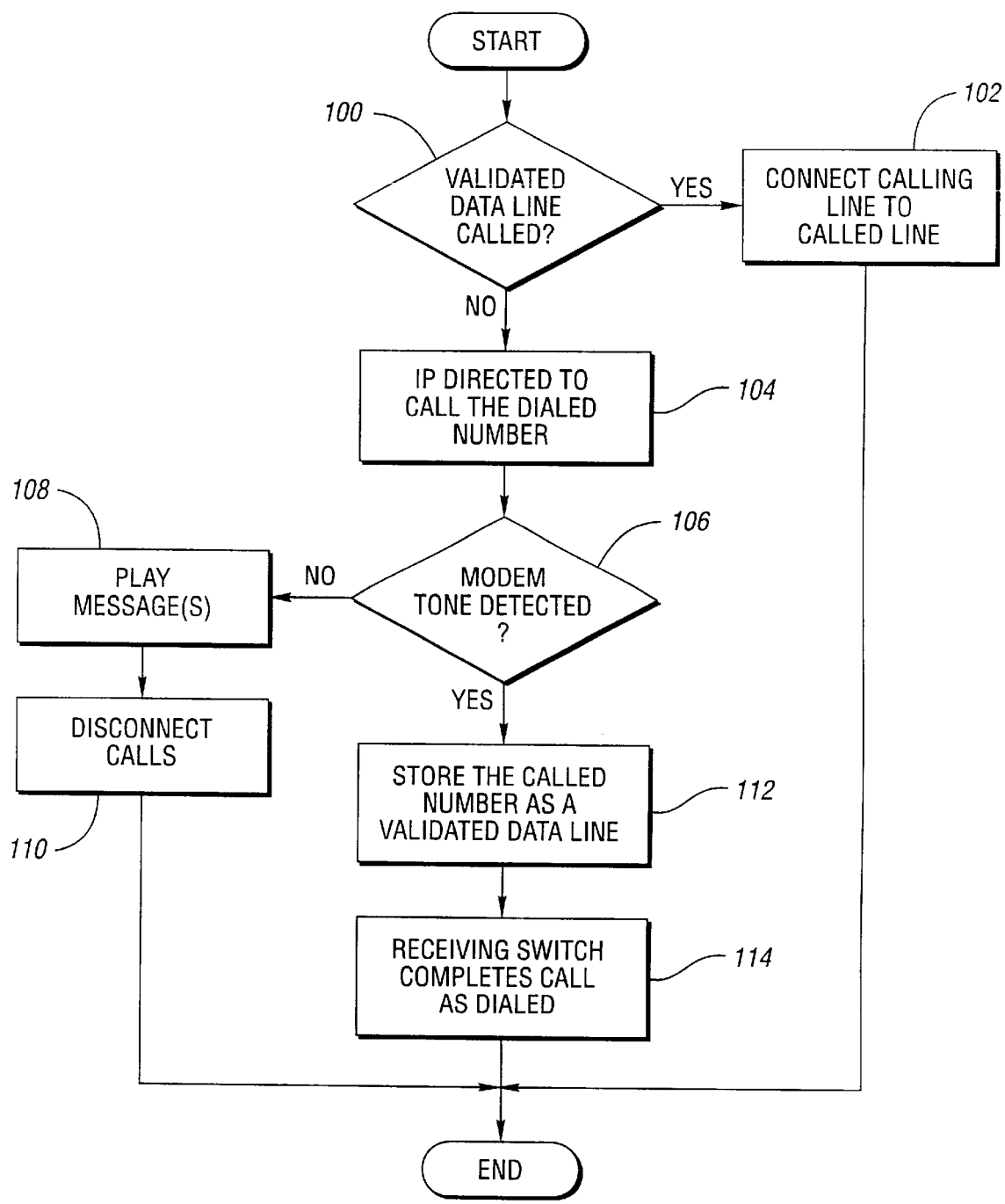
FIG. 4 is a flow diagram illustrating data line validation according to another embodiment of the present invention.

Referring to FIGS. 2–4, flow diagrams illustrating various embodiments of the present invention are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

Referring now to FIG. 2, a flow diagram illustrating data-only telephone service according to an embodiment of the present invention is shown. Communications system 20 receives a call on designated data-only line 26 in block 50. Switch 28 determines if the received call is to an emergency service provider in block 52. Such a determination may be made, for example, by a dialed number such as 911 identified as an emergency number. The received call is switched to an emergency service provider, as in block 54, if the called number is identified as an emergency number.

If the call is not to an emergency number, switch 28 encounters an Off-Hook Delay trigger, suspends call processing and sends an InfoCollected AIN message to SCP 34 through SS7 network 32, as in block 55. The message contains all of the digits of the called number received on data line 26. SCP 34 analyzes the digits to determine if the call was to a local or toll-free number, as in block 56. If the call is not to a local number or to a toll-free number, the call is disconnected in block 58. Restricting the call to a local or toll-free called line 42 helps keep down the cost of using data line 26. In various embodiments, limiting calls to either a local number, to a toll-free number or to both may be preset within communications system 20 or may be selected as an option by the user.

A check is made to determine if the call was placed to a validated data line, as in block 60. If not, the call is disconnected in block 58. If the call was placed to a validated data line, data-only designated line 26 is connected to called line 42 through call interconnect network 30, as in block 62.

Many methods may be used to determine if called line 42 is a validated data line. In one example, SCP 34 maintains table 36 of authorized numbers listed on a subscriber-by-subscriber basis. SCP 34 receives the number of calling data line 26 together with the number of called line 42. SCP 34 searches table 36 for the calling number. If the called number is associated with the calling number in table 36, the called number is a valid data line. SCP 34 then instructs switch 28 to route the call to the dialed number. Otherwise, SCP 34 instructs switch 28 to play a failure announcement on data-only designated line 26 and to disconnect the call.

The subscriber may be provided an ability to modify the list of validated data lines in table 36. For example, the subscriber may use DTMF codes to add or delete validated data lines. If a telephone number is added by the subscriber, the number may be validated as a data line by instructing IP 38 to call the number and attempt to detect a modem tone, as described herein.

Referring now to FIG. 3, a flow diagram illustrating data line validation according to an embodiment of the present invention is shown. A check is made to determine if a validated data line has been called in block 70. SCP 34 checks table 36 for the occurrence of the called number. If the called number appears in table 36, calling data line 26 is connected to called line 42 as in block 72.

If the called number is not to a telephone number listed in table 36, an attempt is made to determine if called line 42 is a valid data line. The received call is routed to the IP, as in block 74. This may be accomplished by SCP 34 sending an AnalyzeRoute AIN message to switch 28 to reroute the call to IP 38. When the call arrives at IP 38, an IPDLN is hit and IP 38 sends a ProvideInstructions AIN message to SCP 34. SCP 34 then instructs IP 38 to dial the called number. IP 38 calls the dialed number in block 76. A ringing announcement may be played to the subscriber while the called number is dialed.

IP 38 attempts to detect a modem tone in block 78. IP 38 listens for a modem tone from called location 44 and reports the results to SCP 34. If no modem tone is received, a failure announcement is played by IP 38 to the subscriber over the originally placed call, as in block 80. If IP 38 receives answer supervision from location 44, IP 38 also plays an apology announcement to called location 44. IP 38 then disconnects both the original call received on data line 26 and the call placed to called line 42, as in block 82.

If IP 38 receives a modem tone from called location 44, SCP 34 stores the called number as a validated data line in table 36, as in block 84. SCP 34 then instructs IP 38 to connect the subscriber to called location 44. SCP 34 instructs IP 38 to bridge the call at switch 40 and release the call, as in block 86.

Referring now to FIG. 4, a flow diagram illustrating data line validation according to another embodiment of the present invention is shown. A check is made to determine if a validated data line was called in block 100. SCP 34 checks table 36 for the number of called line 42. If the number of called line 42 appears in table 36, then called line 42 is a validated data line and calling line 26 is connected to called line 42, as in block 102.

If table 36 does not contain the number of called line 42, an attempt is made to validate called line 42. SCP 34 initiates a Send to Outside Resource (STOR) conversation with IP 38. SCP 34 directs IP 38 to call the dialed number in block 104. SCP 34 may also instructs switch 28 or IP 38 to play a ringing announcement to the subscriber. A check is made for detecting a modem tone in block 106. IP 38 listens to called location 44 and reports the results of the modem tone detection to SCP 34. If no modem tone is heard, SCP 34 instructs switch 28 to play a failure announcement to the subscriber and the call placed on data line 26 is disconnected, as in blocks 108 and 110, respectively. If IP 38 receives answer supervision from called location 44, an apology announcement is played to called location 44. Regardless of whether or not answer supervision is received, IP 38 cancels the call to called location 44.

If IP 38 detects a modem tone from called location 44, SCP 34 stores the called number in table 36, as in block 112. SCP 34 instructs switch 28 to route the call on data line 26 to called line 42, as in block 114.

Various other embodiments are possible. For example, SCP 34 may periodically verify entries in table 36 by instructing IP 38 to call each entry. If IP 38 detects a modem tone from called location 44, the called number remains as a validated data line. However, if IP 38 fails to detect a modem tone from called location 44, the called number is removed from table 36.

In another embodiment, service providers may forward to SCP 34 phone numbers for newly added modems. SCP 34 then places these telephone numbers in table 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing data-only telephone service comprising:
    receiving a telephone call on a telephone line designated data-only, the telephone call specifying a called number;
    determining if the called number is to a validated data line;
    if the called number is to a validated data line, connecting the received call with the called number; and
    if the called number is not to a validated data line, disconnecting the received call.

2. A method of providing data-only telephone service as in claim 1 further comprising switching the received call to an emergency service provider if the called number is identified as an emergency number.

3. A method of providing data-only telephone service as in claim 1 further comprising disconnecting the received call if the called number is not a local number and not a toll-free number.

4. A method of providing data-only telephone service as in claim 1 wherein determining if the called number is to a validated data line is based on the data-only line telephone number.

5. A method of providing data-only telephone service as in claim 1 wherein determining if the called number is to a validated data line comprises determining if a call placed to the called number results in a modem tone from the called number.

6. A method of providing data-only telephone service as in claim 1 further comprising periodically calling each validated data line to determine if the line is still a data line based on receiving a modem tone.

7. A system for providing data-only telephone service to a subscriber telephone line comprising:
    a switch connected to the subscriber telephone line, the switch suspending a call received from the subscriber telephone line and generating a message containing a called number from the received call; and
    a service control point in communication with the switch, the service control point receiving the generated message and determining that the call is to be disconnected if the called number is not to a validated data line.

8. A system for providing data-only telephone service to a subscriber telephone line as in claim 7 wherein the switch is further operative to connect the received call to an emergency service provider if the called number is identified as an emergency number prior to suspending the received call.

9. A system for providing data-only telephone service to a subscriber telephone line as in claim 7 wherein the service control point disconnects the received call if the called number is not a local number and not a toll-free number.

10. A system for providing data-only telephone service to a subscriber telephone line as in claim 7 wherein the service control point determines if the called number is to a validated data line based on the subscriber telephone number.

11. A system for providing data-only telephone service to a subscriber telephone line as in claim 7 further comprising an intelligent peripheral, the intelligent peripheral placing a call to the called number, wherein the called number is a determined to be a validated data line based on receiving a modem tone from the call placed by the intelligent peripheral to the called number.

12. A method of providing data-only telephone service comprising:
    receiving a telephone call at a switch servicing a telephone line designated as a data-only line, the received call specifying a called number;
    suspending the received call at the switch;
    forwarding the called number to a service control point;
    determining if the called number is a validated data line at the service control point;
    connecting the received call with the called number if the called number is to a validated data line; and
    disconnecting the received call if the called number is not to a validated data line.

13. A method of providing data-only telephone service as in claim 12 wherein determining if the called number is a validated data line comprises searching a table maintained by the service control point.

14. A method of providing data-only telephone service as in claim 12 further comprising switching the received call to an emergency service provider before suspending the received call if the called number is identified as an emergency number.

15. A method of providing data-only telephone service as in claim 12 further comprising disconnecting the received call if the called number is not a local number.

16. A method of providing data-only telephone service as in claim 12 further comprising disconnecting the received call if the called number is not a toll-free number.

17. A method of providing data-only telephone service as in claim 12 wherein determining if the called number is a validated data line comprises:

routing the call from the switch to an intelligent peripheral;

calling the called number from the intelligent peripheral;

if the called number responds with a modem tone, connecting the received call to the called number call; and disconnecting both the received call and the called number call if the called number call does not respond with a modem tone.

18. A method of providing data-only telephone service as in claim 17 further comprising adding the called number to a table of validated data lines if the called number responds with a modem tone.

19. A method of providing data-only telephone service as in claim 12 wherein determining if the called number is a validated data line comprises:

determining that the called number is not in a table of validated data lines;

commanding an intelligent peripheral to call the called number;

if the intelligent peripheral receives a modem tone from the called number call, instructing the switch to route the received call to the called number and storing the called number in the table of validated data lines; and if the intelligent peripheral does not receive a modem tone from the called number, disconnecting the received call.

20. A method of providing data-only telephone service as in claim 12 wherein each validated data line is periodically verified based on the detection of a modem tone received by calling the validated data line.

* * * * *